July 15, 1952 — H. W. PINCKNEY — 2,603,417
CARRIAGE POSITION CONTROL MEANS FOR CALCULATING MACHINES
Filed Sept. 14, 1950 — 5 Sheets-Sheet 1
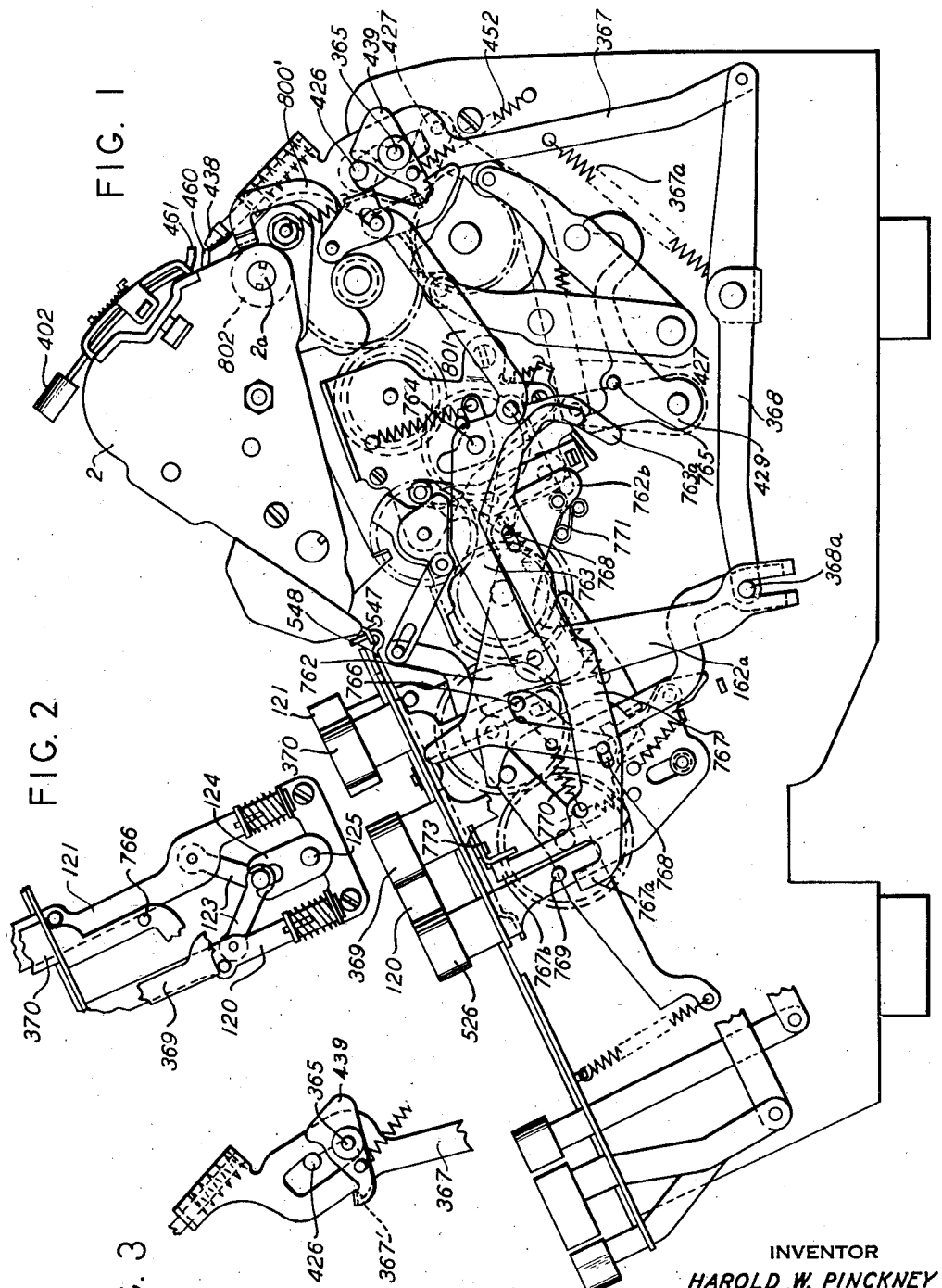
INVENTOR
HAROLD W. PINCKNEY
BY
George V. Hall
ATTORNEY INVENTOR
HAROLD W. PINCKNEY
BY
*George V. Hall*
ATTORNEY July 15, 1952 H. W. PINCKNEY 2,603,417
CARRIAGE POSITION CONTROL MEANS FOR CALCULATING MACHINES
Filed Sept. 14, 1950 5 Sheets-Sheet 4

INVENTOR
HAROLD W. PINCKNEY
BY
George V. Hall
ATTORNEY

July 15, 1952 H. W. PINCKNEY 2,603,417
CARRIAGE POSITION CONTROL MEANS FOR CALCULATING MACHINES
Filed Sept. 14, 1950 5 Sheets-Sheet 5

INVENTOR
HAROLD W. PINCKNEY
BY
*George V. Hall*
ATTORNEY

UNITED STATES PATENT OFFICE 2,603,417

CARRIAGE POSITION CONTROL MEANS FOR CALCULATING MACHINES

Harold W. Pinckney, Eugene, Oreg., assignor to Monroe Calculating Machine Company, Orange, N. J., a corporation of Delaware Application September 14, 1950, Serial No. 184,744

5 Claims. (Cl. 235—63)

The invention relates to carriage position control means for calculating machines and the like and more particularly to the control of means for tabulating a transversely shiftable carriage to a selected denominational position.

In the performance of many calculations, it is necessary to tabulate the carriage to a selected denominational position to properly relate the factors of the problem before the institution of the operation. Furthermore in certain types of calculating machines it is necessary to shift the carriage to a given position before a particular operation can be instituted.

In the copending applications of Herman Gang, Serial Nos. 8,544 (now Patent 2,531,204) and 75,955 (now Patent 2,572,920), issued on November 21, 1950, and October 20, 1951, respectively, there are shown calculating machines of the type having denominationally shiftable carriages. The machine disclosed in application 8,544 also includes a plurality of settable tabulator keys operable in conjunction with right and left carriage shift keys to cause positioning of the carriage in an intermediate position after initiation of a carriage shift by operation of a shift key. The machine as disclosed in application 75,955 includes carriage positioning control means operable to shift the carriage to a given position before a particular operation can be instituted. In the machines of the above applications, a multiplier entering operation and institution of a program of multiplication may be effected only with the carriage in its left end posion. While the carriage positioning control means of the machine of application Ser. No. 75,955 may be incorporated into a machine having the tabulating means of application Ser. No. 8,544, machines thus constructed have the disadvantage that the tabulating means may interfere with the intended operation of the carriage positioning control means if the tabulating means is not released or normalized. That is, in the machine of application Ser. No. 75,955 the control devices operate to depress the left shift key if the carriage is out of the left end position. If, however, the operator fails to release any set tabulator keys, the carriage may not shift to its leftmost position, necessitating further operation of the machine to accomplish the desired program.

The devices of the present invention avoid the afore outlined disadvantageous operational features by disablement of the tabulating means upon operation of the control devices of application No. 75,955. Furthermore, a desired tabular setting may be maintained for subsequent operations.

Other advantages of the invention will be apparent from the following description of a preferred embodiment thereof when read in conjunction with the accompanying drawings wherein reference numerals applied to certain parts designate like parts in applications Nos. 8,544 and 75,955.

In the accompanying drawings,

Fig. 1 is a right side elevation of a calculating machine embodying the invention and showing the parts in normal position.

Fig. 2 is a detailed fragmentary right side elevation of the plus and minus bars related to the right and left carriage shift keys.

Fig. 3 is a fragmentary detailed view showing a portion of the carriage shift initiating means in an operated position.

Carriage shifting mechanism

The registering and carriage shifting mechanisms of the machine embodying the invention are constructed and operate substantially in accordance with the disclosure of Patent No. 2,419,760 of E. F. Britten, Jr., as modified by the disclosure of co-pending application No. 8,548 (now Patent 2,531,207), issued on November 21, 1950, to Herman Gang.

Figure 7:
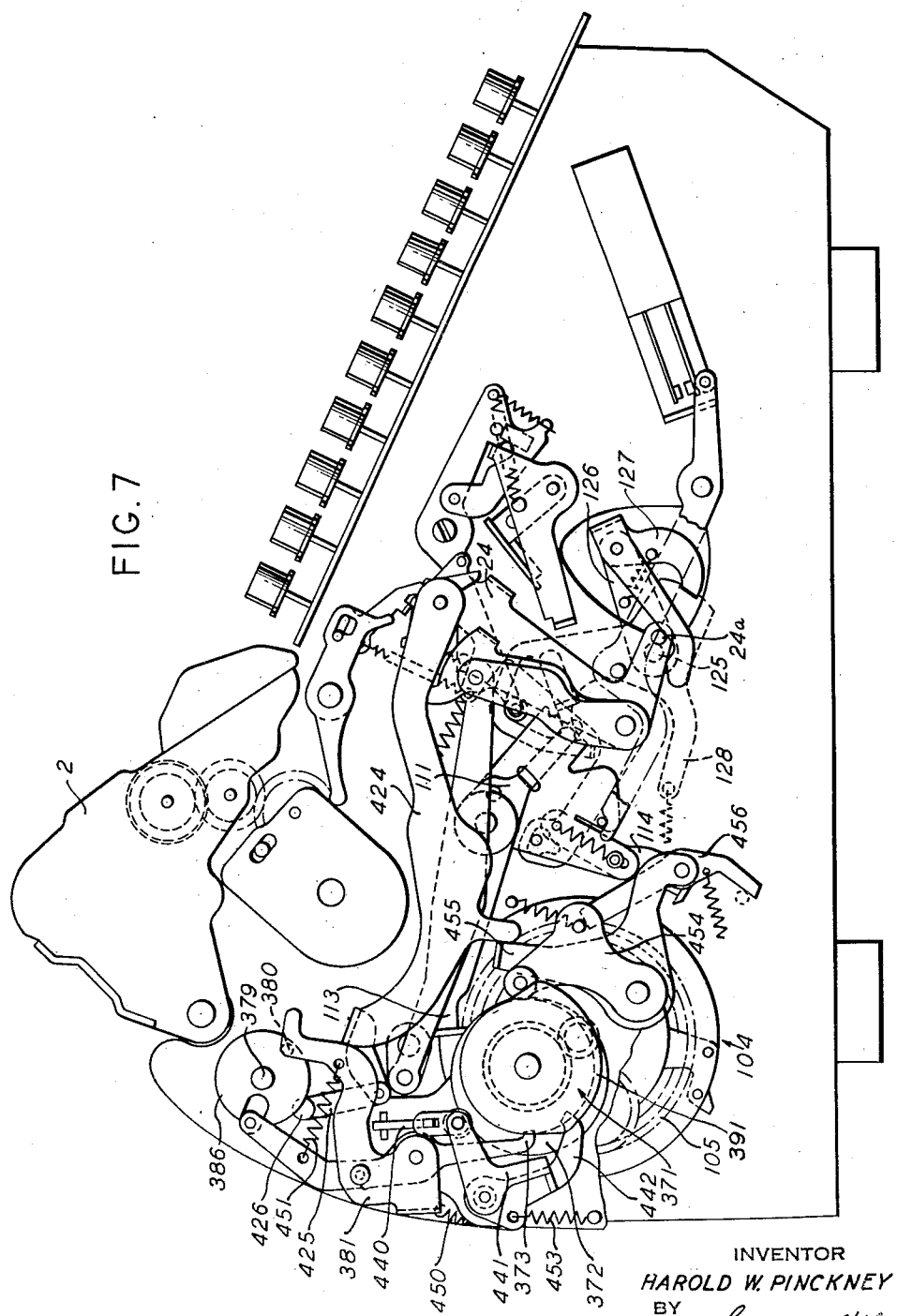
Fig. 7 is a left side elevation of the machine showing details of the carriage shift control and terminating means.
Figure 11:
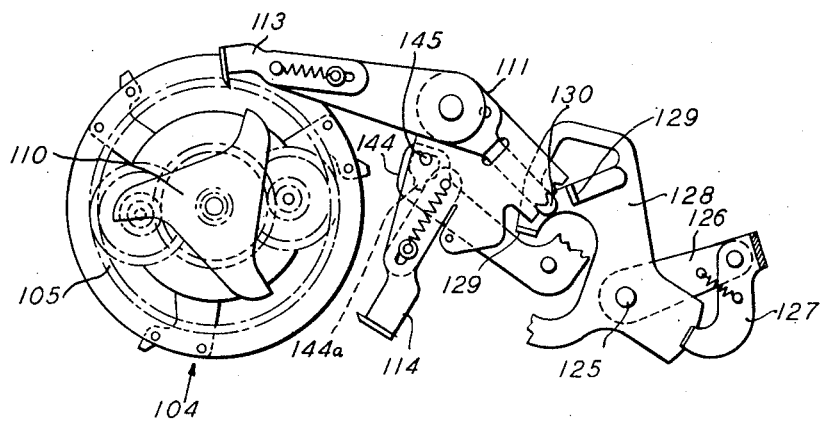
Fig. 11 is a detailed side elevation of the differential clutch mechanism and controls therefor.

The registering and carriage shifting operations are performed by power transmitted from a motor 1 (Fig. 9) through a differential clutch mechanism 104 (Figs. 7 and 11). The registering mechanism is connected to the differential clutch mechanism 134 by a normally engaged friction clutch 352 (Fig. 9) and alternatively the carriage shifting mechanism is connected by engagement of a normally disengaged friction clutch 353 which is engaged upon disengagement of the registration clutch.

The differential clutch mechanism is constructed substantially in accordance with the disclosure of Patent 1,566,650 of George C. Chase. Normally, the gearing comprising both working legs of the differential drive rotate idly as described in the aforenoted patent; interruption of the movement of one leg causing the planet gears to move in their orbit in one direction accordingly rotation output gear 408 (Fig. 9) and interruption of the movement of the other leg causing rotation in the reverse direction. The working legs of the differential drive are selectively arrested by means of a clutch lever 111 (Figs. 7 and 11) fulcrumed on the machine left side frame and adjustable to neutral, additive and subtractive setting. A click pawl (not shown) holds clutch lever in its adjusted positions. The two active settings provide for additive and subtractive registration or, alternatively, for right and left carriage shift respectively. Clockwise movement of lever 111 positions it to additive setting whereby a hook arm 114 of said lever will engage a lug on gear 105 forming one leg of the differential drive to interrupt its movement, thereby causing rotation of output gear 408. Conversely, counterclockwise movement positions lever 111 to subtractive setting whereby a hook arm 113 thereof will engage a stop 110 of the other leg of the differential to interrupt its movement and cause rotation of output gear 408 in the reverse direction.

Clutch lever 111 is moved to engage differential clutch 104 for additive or subtractive registration upon depression of a plus bar 120 (Figs. 1 and 2) or a minus bar 121 respectively. Alternatively plus bar 120 and minus bar 121 are depressed upon depression of a right shift key 369 and a left shift key 370 respectively; and concurrently the depressed shift key causes the disengagement of registration clutch 352 and the attendant engagement of shift clutch 353 thereby connecting the carriage shifting mechanism to engaged differential clutch 104.

The stems of right and left shift keys 369, 370, are provided with shoulders which overlie pins in the stems of plus and minus bars 120, 121 respectively. Therefore, depression of a shift key concurrently will depress the related plus or minus bar 120, 121. The plus bar 120 and minus bar 121 are connected by links 123 (Fig. 2) with an arm 124 which is fixed on a rock shaft 125. Shaft 125 extends across the machine and fixed thereon inwardly of the left side frame is an arm 126 (Figs. 7 and 11) having coupling connection 127 with a setting plate 128. Setting plate 128 has opposed lugs 129 positioned at opposite sides of a tooth 130 of clutch lever 111. Upon depression of plus bar 120 or minus bar 121, shaft 125 and plate 128 will be rocked in one or the reverse direction thereby engaging one or the other of lugs 129 with tooth 130 and rocking clutch lever 111 to either its additive or subtractive position. Setting plate 128, when released, is normally spring located in a central position and when in this position, lugs 129 are so spaced from tooth 130 that clutch lever 111 may be moved independently of plate 128, and without interference therefrom, to either of its active positions. Coupling 127 permits plate 128 to be uncoupled from shaft 125 so that clutch lever 111 may be moved to disengage the drive while the plus or minus bar is held depressed.

The driving members of registration clutch 352 and shift clutch 353 are connected by a sleeve 354 (Figs. 9 and 10) and are longitudinally movable to compress the friction disks of the normally engaged clutch 352 or alternatively the friction disks (not shown) of the normally disengaged shift clutch 353. Power is transmitted from differential clutch 104 for the registering and carriage shifting operations to the driving members of clutches 352 and 353 by a gear 355 fixed on the driving member of clutch 353 and engaged by the output gear 408 of differential clutch 104. The driven element of shift clutch 353 is fast with a gear 356 having intermediate gear connection with a gear 357 fast upon a shaft 379 which carries shift worm 358. A spring urged plunger 359 is mounted on the rear of carriage 2 and engages shift worm 358. Therefore, upon disengagement of registration clutch 352 and the engagement of shift clutch 353, differential clutch 104, upon engagement, will drive worm 358 to shift carriage 2 one denominational order for each revolution of the worm.

Figure 4:
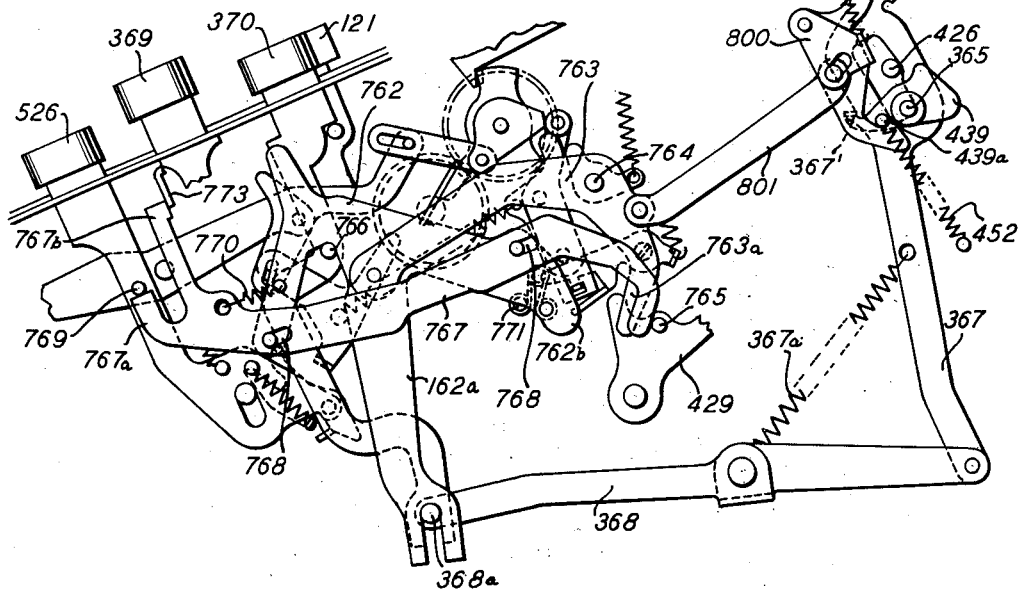
Fig. 4 is a detailed right side elevation of the devices of the invention shown in Fig. 1 in an operated position.
Figure 5:
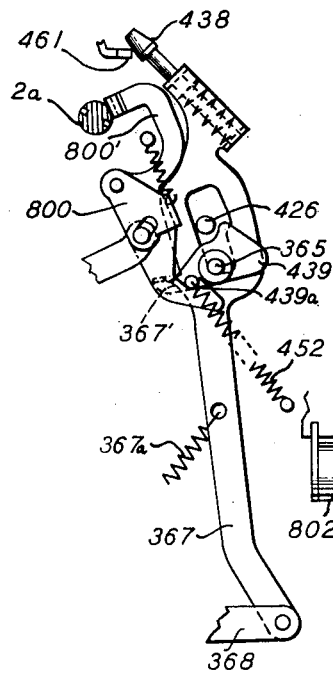
Fig. 5 is a detailed view of parts shown in Fig. 4 in another operated position.
Figure 9:
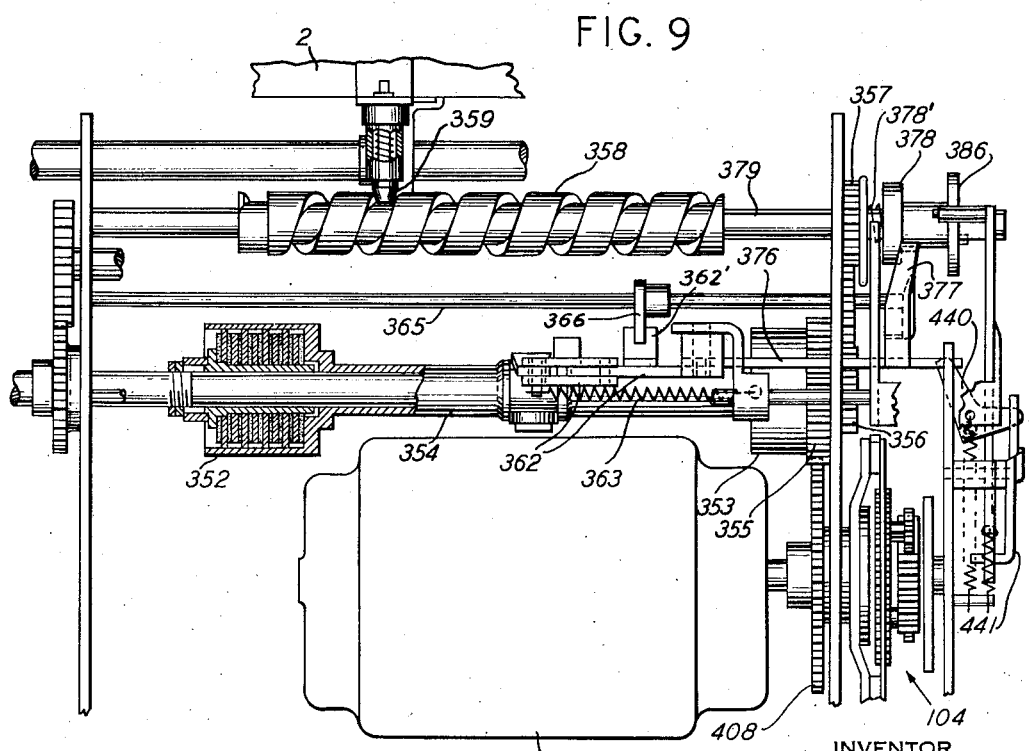
Fig. 9 is a rear view of the machine showing details of the carriage shift controls and driving means.
Figure 10:
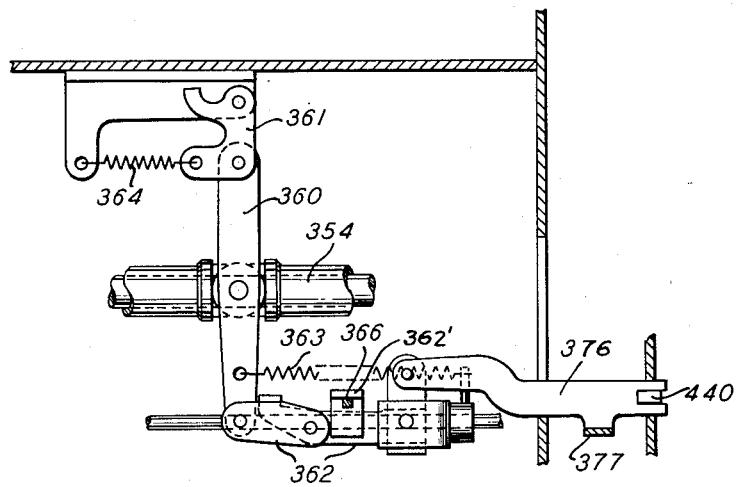
Fig. 10 is a fragmentary plan view of parts shown in Fig. 9.

Registration clutch 352 is held normally in engagement by a toggle comprising links 362 (Figs. 9 and 10). The right toggle link, as viewed in Figs. 9 and 10, has fixed pivotal mounting at its right end and the left toggle link is pivotally connected at its left end to one end of a lever 360. The other end of lever 360 is connected to the machine frame by a link 361 and antifriction rollers mounted intermediate the ends of lever 360 engage a pair of flanges on sleeve 354 which connects the driving members of clutches 352, 353. A spring 364 attached to lever 361 biases sleeve 354 toward the left, thereby holding clutch 352 engaged under spring tension. Upon breaking of toggle 362, a spring 363, attached to lever 360 will shift sleeve 354 toward the right, thereby disengaging clutch 352 and engaging shift clutch 353. Toggle 362 is broken upon depression of a shift key 369 or 370 as follows:

One intermediately pivoted lever 368 (Figs. 1, 4 and 5) is engaged at its forward end by the stems of shift keys 369, 370, and at its rear end lever 368 is pivotally connected with the lower end of an arm 367 which is guided at its upper end by slot engagement with a shaft 365. A shoulder 367' of arm 367 underlies a laterally bent lug of a lever 439 which is fast on shaft 365. A finger 366 (Figs. 9 and 10) also fast on shaft 365 engages a lug 362' of the right toggle link adjacent its connection with the other link of the toggle 362. Upon depression of one or the other of the shift keys, lever 368 will be rocked, thereby raising arm 367 to the position shown in Figs. 4 and 5 and causing shoulder 367' to rock lever 439, shaft 365, and finger 366 to break toggle 362. Accordingly, registration clutch 352 (Fig. 9) will be disengaged and shift clutch 353 engaged as differential clutch 104 is selectively engaged to determine the direction of carriage shift.

Certain other controls are necessary in effecting the shifting operation, since the carriage shifting worm 358 must be released from a normal location means when the operation is initiated. Also, at the end of the shifting operation, differential clutch 104 must be disengaged and toggle 362 must be reset to disengage shift clutch 353 and reengage registration clutch 352.

These operations are effected by a two phase shift control clutch 371 (Figs. 7 and 8) which is engaged for a partial cycle of operation when toggle 362 is broken and again engaged upon termination of the shift to complete its cycle of operation. The driving element of the clutch has direct gearing connection with the motor 1, and a spring biased clutch pawl mounted upon the driven element of the clutch is normally held out of engagement with the driving element against the tension of its spring by a detent 442 engaging the pawl through a cut-away portion of the clutch housing.

Figure 8:
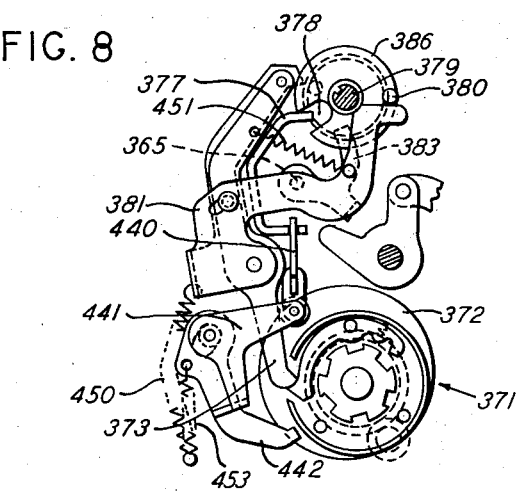
Fig. 8 is a left side detail of portions of the carriage shift control means in an operated position.

When toggle 362 is broken to initiate a shift, a link 376 (Figs. 9 and 10) connected to a crank extension of the right link of toggle 362 will be moved to the right, thereby rocking a pair of bell cranks 440, 441. (Figs. 7 and 8.) Bell crank 441 engages detent 442 and its rocking movement will move the detent against the tension of a spring 453 from engagement with the pawl of clutch 371, thereby permitting the pawl to engage the clutch. The lower active end of an intermediately pivoted detent 373 normally engages the housing of clutch 371, and a roller at the upper end of the detent normally engages a notch in a disk 386 as shown in Fig. 7. Disk 386 is splined on worm shaft 379 and the engagement of the roller of detent 373 in the notch of the disk will prevent rotation of shift worm 358 and consequently hold carriage 2 in its shifted position. Upon partial rotation of clutch 371, detent 373, as shown in Fig. 8, will be urged through the aperture of the clutch housing by a spring 450 attached to a tripping arm 381 which has pin and slot connection with the detent. This movement of detent 373 will engage its lower end with the pawl of clutch 371, thereby disengaging the clutch, and will remove the roller at its upper end from the notch of disk 386, thereby freeing worm 358 for the shifting operation.

The carriage will be continuously shifted until the depressed shift key 369 or 370 (Figs. 1 and 2) is released or until the carriage has been shifted into one or the other of its end positions.

Upon release of the shift key, spring 452 (Figs. 1, 4, and 5) will restore shaft 365 to provide for reengagement of shift control clutch 371 as follows: Disk 386 as shown in Fig. 9, is connected by a sleeve with a second disk 378 which is normally held toward the left against the bias of a spring 378' by an arm 377 of link 376. Upon breaking of toggle 362 arm 377 will be moved to the right (Fig. 9) with link 376. However, disk 378, and with it disk 386, will now be held in leftward position by a stop arm 383 (Fig. 8) which is fixed on shaft 365 and is moved into engagement with disk 378 when said shaft is rocked to break toggle 362. When shaft 365 is restored upon release of the depressed shift key, stop arm 383 will be moved from engagement with disk 378 and spring 378' will then be effective to move disks 378, 386 toward the right. Upon movement of disk 386 to the right, a pin 380 (Figs. 7 and 8) on the disk will be brought into the plane of a cam extension of tripping arm 381. As the current shift cycle nears completion, pin 380 will engage the cam extension of the tripping arm 381, thereby putting detent 373 under tension of a spring 451 which connects the detent and the tripping arm. Therefore, as the parts arrive at full cycle position the roller of detent 373 will be moved into the notch of disk 386 thus locating the carriage in its new position and rocking said detent from engagement with the pawl of clutch 371 thereby permitting reengagement of the clutch.

The final phase of operation of shift control clutch 371 effects the disengagement of differential clutch 104 and resets toggle 362, thereby reengaging registration clutch 352 and disengaging shift clutch 353. For the purpose of disengaging differential clutch 104, a cam 372 (Figs. 7 and 8) fast with the driven element of clutch 371 engages a roller mounted on a follower 454. Follower 454 has latch connection 456 with a lever 455 which engages a shoulder of a link 424. Link 424 is pivotally attached at its forward end to the upper end of a stop arm 24 (Fig. 7) which is pivotally mounted at its lower end to the machine frame, and at its rear end link 424 is attached to a crank 425 fixed on a rock shaft 426 which extends across the machine. Stop arm 24 is spring biased in normal counter-clockwise position against a fixed stop and in the final operation of clutch 371, stop arm 24 will be rocked in clockwise direction by cam 372 through the connecting linkage and returned to normal by its spring. In the reciprocatory movement of stop arm 24, a cam slot 144a (Fig. 11) at the rear of an extension 144 of the arm will engage a pin 145 of clutch lever 111 thereby moving said lever to neutral position. Furthermore upon reciprocation of arm 24, shaft 426 will be rocked counterclockwise (Fig. 7) and return by link 424. Shaft 426 has link connection 427 (as shown in dotted lines Fig. 1) with an arm 429 which is pivotally mounted on the right side frame. When shaft 426 is rocked, arm 429 will be rocked to effect operations hereinafter described.

Toggle 362 will be reset during the final operation of clutch 371 by means of a cam 391 (Fig. 7) fast on the driven element of the clutch and engaging a roller on bell crank 441. Thus, bell crank 441 and connected bell crank 440 will be restored, thereby moving link 376 to the left (Figs. 9 and 10) and resetting toggle 362 which will reengage registration clutch 352 and disengage shift clutch 353. Also, restored bell crank 441 will release detent 442 which will engage the pawl of clutch 371 and disengage said clutch.

*Carriage shift (last place stop and tabulating keys)*

Figure 6:
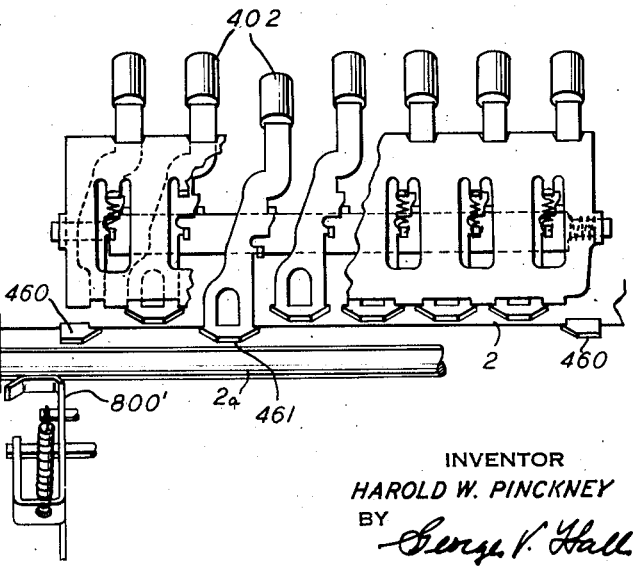
Fig. 6 is a fragmentary detail of the tabular keys related to devices of the invention as viewed from the rear of the machine.

Should either shift key be held depressed until the carriage is shifted into an end position, shift initiating shaft 365 (Figs. 1, 4, and 5) will be restored to normal and the drive terminated in substantially the same manner as described when shaft 365 is restored upon release of shift key. For this purpose, two lugs 460 (Fig. 6) are located on the rear of carriage 2 and so spaced that the nose of a plunger 438 (Figs. 1, 4 and 5) mounted on arm 367 is positioned just below one or the other of said lugs when the carriage is in either of its end positions. Should the carriage be in the right end position, for example, and the left shift key 370 depressed, the plunger 438 which is spring urged to a normal extended position will be depressed by contact with the leftmost lug 460 when arm 367 is raised and the shift initiated.

When the carriage is shifted from the right end position, the lug 460 will be removed from contact with plunger 438 and said plunger will be spring urged to normal extended position. As the carriage is shifted into the left end position, the side of the nose of plunger 438 will be engaged by the rightmost lug 460, thereby moving the plunger and arm 367 toward the rear (Fig. 5) of the machine against the tension of a spring 367a. This movement of arm 367 will remove the shoulder 367' thereof from restraining engagement with the lug of lever 439 allowing said lever and shaft 365 to be spring restored to normal and thus terminate the shift. Upon movement of stop arm 24 (Fig. 7) to disengage differential clutch 104, a pin 24a of the stop arm will engage and disconnect coupling 127 so that setting plate 123 may be spring restored to normal and thus permit clutch lever 111 to be moved to neutral position. When the shift key and the related plus or minus bar is finally released, coupling 127 will be restored by shaft 125 to reengage setting plate 123. Also, upon release of the shift key, plunger 438 will drop below lug 460 and arm 367 will be urged forwardly by its spring, thus locating shoulder 367' thereof in normal engagement with lever 439. Termination of a carriage shift in the opposite end position is, as will be readily understood, accomplished in the same manner. Should a shift key be depressed while the carriage is in the end position of the indicated shift, engagement of the shifting drive will be effected, but as the plunger 359 is at the end of worm 358 the drive will be ineffective to move the carriage. However, plunger which is spring urged within the groove of worm 358 will be raised to ride over the outer diameter of the worm by the eccentric conformation of the worm at either end.

The tabular keys 402 (Figs. 1 and 6) one for each denominational order intermediate the two end positions of the carriage, are located on the rear of the carriage intermediate the lugs 460. The lower end 461 of each key 402 is bent outwardly from the carriage to form a lug at substantially the same angle as the lugs 460, and is provided with a pair of oppositely inclined edges which are adapted to displace plunger 438 in the same manner as described in connection with the inclined cam edges of the lugs 460. In the unset position of tabular keys 402, the lugs 461 are raised above and out of the range of plunger 438 when a shift key is depressed. However, when one of the keys 402 is depressed, its lug 461 is brought into the same plane as the lugs 460 and should the carriage be shifted either to the right or left, the arm 367 will be displaced (Fig. 5) pivotally against the tension of its spring by contact of the nose of plunger 438 with one or the other of the cam edges of the lug 461 of the set tabular key to terminate the shift in the same manner as that previously described in connection with lugs 460 of the carriage. It will be noted that upon termination of the carriage shift arm 367 will be held in rearwardly displaced position by contact of the nose of plunger 438 with the lug 461 of the set key. However, upon release of the shift key, arm 367 will be lowered and moved forwardly by its spring, shoulder 367' of said arm will be positioned below the lug of lever 439, and plunger 438 will be located below the lug 461 of the set key. With plunger 438 being thus restored to normal lowered position and the carriage being still located in the order indicated by the set tabular key, upon depression of either shift key and the consequent raising of arm 367, the plunger 438 will be depressed against the tension of its spring by contact with the overlying lug 461 of the set key. Therefore there will be no interference with the raising of arm 367 in initiating the shift. The carriage being thus shifted into a new order, the lug 461 of the set key will no longer overlie plunger 438, which will be restored to normal extended position by its spring and thus conditioned to contact one or the other of the end lugs 460 of the carriage to terminate the shift in either extreme position thereof.

*Carriage position control means*

The devices of the invention are disclosed as related to the afore described tabulating means in conjunction with control of the carriage shifting mechanism by the carriage position control means of co-pending application 75,955 heretofore noted. Other control operations effected by the devices of said application have no operating relation with the devices of the present invention and reference is made to said application for the details of operation not disclosed herein.

The carriage position control means comprises a member 762 (Figs. 1 and 4) which is pivotally supported at the end of a forwardly extending arm of a bell crank 763. Bell crank 763 is pivotally mounted on a fixed stud 764 on the left side frame and the depending arm thereof is adapted for engagement by a pin 765 of arm 429. Member 762 overlies a pin 766 in the stem of left shift key 370 and a downwardly extending leg 162a of said member is provided with an open end slot which engages pin 368a at the end of the forward arm of lever 368. An adjustable slide 767 has pin and slot mounting 768 on member 762 and an upstanding shoulder 767a at its left end is engageable by a pin 769 on the stem of a freely retractable operating member comprising key 526. Slide 767 is urged by spring 770 toward the rear of the machine thereby locating shoulder 767a thereof below and into the path of movement of pin 769 when the carriage is out of its leftmost position. However, adjusting means comprising arm 773, lever 548 and carriage lug 547 through finger 767b operates to move slide 767 forwardly against the tension of its spring when carriage 2 is shifted to the left end position thereby locating shoulder 767a out of the path of movement of pin 769. Reference is made to application 75,955 for the details of the adjusting means of slide 767. The control means comprising member 762, bell crank 763, and slide 767 are held in normal raised position (Fig. 1) by means of a toggle spring 771 attached to arm 762b and to a pin on the machine frame; the upward movement being limited by contact of member 762 with the key plate of the machine.

From the foregoing, it will be seen that if the carriage is in its left end position, depression of key 526 will move pin 769 ineffectively to the rear of shoulder 767a of slide 767. However, if the carriage is out of the left end position, depression of key 526 will engage pin 769 (Fig. 4) with shoulder 767a thereby rocking slide 767, member 762 and bell crank 763 counterclockwise as a unit about pivot 764 thus depressing left shift key 370.

Upon release of key 526, the parts will be held in operated position by toggle spring 771 thus holding left shift key 370 depressed. Upon movement of the carriage into the left end position, the shifting operation will be terminated and as an incident thereto arm 429 will be rocked counterclockwise as described. The counterclockwise movement of arm 429 will engage pin 765 thereon with the depending arm 763a of bell crank 763 thereby rocking said crank and the connected parts clockwise to normal thus releasing the depressed shift key.

It will be noted that should key 526 be held depressed until the carriage is shifted into the left end position, shoulder 767a will be moved from engagement with pin 769 and therefore there will be no interference with the clockwise restoration of the parts upon termination of the shift.

*Disablement of the tabulating means*

A shifting operation instituted upon depression of key 526 (Figs. 1 and 4) is intended to be terminated upon movement of the carriage into the left end position as described. However, a tabular key 402 set in a position intermediate the left end and a rightward position of the carriage, would result in the termination of a leftward carriage shift out of the left end position. Such undesirable and unintended operation is prevented by disablement of the normal shift terminating operation of any set tabular keys 402 by the devices of the invention.

The disabling means comprises a latch lever 800 which is pivotally mounted on the left side frame adjacent lever 439. Latch 800 is spring biased toward counterclockwise effective position but is normally held in clockwise ineffective position (Fig. 1) by pin and slot connection with a link 801 which has pivoted connection at its forward end with the depending arm 763a of bell crank 763. Therefore when bell crank 763 is in normal clockwise position, link 801 will be held toward the front of the machine thereby holding latch 800 in ineffective clockwise position against the tension of its spring.

Upon depression of key 526 and the attendant counterclockwise movement (Fig. 4) of bell crank 763, link 801 will be moved toward the rear thus permitting counterclockwise movement of spring urged latch 800. A pin 439a on the forward arm of lever 439 will be raised above the active end of latch 800 when said lever and shaft 365 are moved clockwise to initiate the shifting operation. The active end of spring urged latch 800 will therefore be moved beneath pin 439a to prevent the counterclockwise shift terminating movement of lever 439 and shaft 365 should arm 367 be displaced (Fig. 5) by a lug 461 of a set tabular key 402.

When latch 800 is moved to active position, the free end of an upwardly extending arm 800' thereof will be moved counter-clockwise into engagement (Figs. 4, 5, and 6) with carriage shaft 2a. Shaft 2a moves longitudinally with the carriage in the shifting operation and has suitable bearing in the machine frame thereby supporting the carriage at its rear. A collar 802 (Figs. 1 and 6) is mounted on shaft 2a adjacent its right end (left end Fig. 6). Upon movement of the carriage into its left end position, collar 802 will engage arm 800' and rock latch 800 clockwise from the position shown in Fig. 5 which movement is permitted by the pin and slot connection with link 801. Lever 439 and shaft 365 will therefore be released by latch 800 to terminate the shift. The slot and pin connection with latch 800 will permit forward movement of link 801 to normal (Fig. 1) upon clockwise movement of bell crank 763 to normal thus holding latch 800 in normal ineffective position when the carriage is shifted from its left end position and arm 800' is removed from engagement with collar 802.

Although a specific embodiment of the invention has been disclosed, it will be apparent that other applications of the invention may appear to those skilled in the art. It is understood therefore that the invention is to be restricted only as necessitated by the spirit of the appended claims.

I claim:

1. In a motor driven calculating machine having a denominationally shiftable carriage, mechanism operable to shift said carriage to any one of a plurality of intermediate positions and to an end position including a control member movable to initiate the operation, means operable to terminate operation of said shifting mechanism and a carriage position device operable upon movement of said carriage into said end position to initiate operation of said shift terminating means; the combination of a plurality of depressible tabular keys each including a contact member corresponding to a respective one of said intermediate positions and adjustable from ineffective to effective position upon depression of the related key, means for maintaining any of said keys in depressed position, an element displaceable by the contact member of any depressed key upon movement of said carriage into the intermediate position corresponding thereto, power means including a spring operable upon displacement of said element to initiate operation of said shift terminating means and an operating member for moving said shift control member to shift initiating position; with a normally ineffectively positioned latch adjustable upon movement of said operating member to restrain said power means from operation upon displacement of said element and means operable to adjust said latch to ineffective position upon movement of said carriage into said end position.

2. In a motor driven calculating machine having a denominationally shiftable carriage and mechanism operable to shift said carriage to anyone of a plurality of intermediate positions and to an end position including a control member movable to initiate the operation; the combination of a plurality of depressible tabular keys each including a contact member corresponding to a respective one of said intermediate positions and adjustable from ineffective to effective position upon depression of the related key, a non-adjustable contact member, means for maintaining any of said keys in depressed position, an element displaceable by the contact member of any depressed key upon movement of said carriage into the intermediate position corresponding thereto or by said non-adjustable contact member upon movement of said carriage into said end position, means operable to terminate operation of said carriage shifting mechanism including spring powered initiating means operable upon displacement of said element and an operating member for moving said shift control member to shift initiating position; with a normally ineffectively positioned latch adjustable upon movement of said operating member to hold the operation of said spring powered means in abeyance upon displacement of said element by the contact member of a depressed key and means operable to adjust said latch to ineffective position upon movement of said carriage into said position.

3. In a motor driven calculating machine having a denominationally shiftable carriage, mechanism operable to shift said carriage to a plurality of intermediate positions and to an end position, a spring retracted member movable to position effective to initiate and to maintain operation of said carriage shifting mechanism, a shift control train operable to move and to hold said member in effective position including a coupling displaceable to permit independent retraction of said member by its spring, means responsive to the retraction of said member to terminate operation of said carriage shifting mechanism and a contact member for displacing said coupling upon movement of said carriage into said end position; the combination of a plurality of depressible tabular keys each corresponding to a respective one of said intermediate positions, means for maintaining any of said keys in depressed position, a plurality of contact members each related to a respective key and each adjustable upon depression of the related key from ineffective position to a position effective to displace said coupling upon movement of said carriage into the position corresponding to the depressed key and an operating member for moving said shift control train to operated position; with a normally ineffectively positioned latch adjustable upon movement of said operating member to restrain said spring retractable member in effective position upon displacement of said coupling and a contact member for adjusting said latch to ineffective position upon movement of said carriage into said end position.

4. In a motor driven calculating machine having a fixed frame, a carriage transversely shiftable on said frame to a plurality of denominational intermediate positions and to an end position and mechanism for shifting said carriage to any of said positions including a shift control member movable to initiate the operation; the combination of a plurality of depressible tabular keys each including a contact member corresponding to a respective one of said intermediate positions mounted on said carriage and adjustable from ineffective to effective position upon depression of the related key, a fixed contact member mounted on said carriage, means for maintaining any of said keys in depressed position, an element mounted on said frame and displaceable by the contact member of any depressed key upon movement of said carriage into the intermediate position corresponding thereto or by said fixed contact member upon movement of said carriage into said end position, means operable to terminate operation of said carriage shifting mechanism including spring powered initiating means operable upon displacement of said element and an operating member for moving said shift control member to shift initiating position; with a normally ineffectively positioned latch adjustable upon movements of said operating member to hold the operation of said spring powered means in abeyance upon displacement of said element by the contact member of depressed key and means operable to adjust said latch to ineffective position upon movement of said carriage into said end position.

5. In a motor driven calculating machine having a fixed frame, a carriage transversely shiftable on said frame to a plurality of denominational intermediate positions and to an end position, mechanism for shifting said carriage to any of said positions, a spring retracted member mounted on said frame and movable to position effective to initiate and to maintain operation of said shifting mechanism, a shift control train operable to move and to hold said member in effective position including a coupling displaceable to permit independent retraction of said member by its spring, means responsive to the retraction of said member to terminate operation of said carriage shifting mechanism and a contact member fixed on said carriage for displacing said coupling upon movement of said carriage into said end position; the combination of a plurality of depressible tabular keys mounted on said carriage and each corresponding to a respective one of said intermediate positions, means for maintaining any of said keys in depressed position, a plurality of contact members each related to a respective key and each adjustable upon depression of the related key from ineffective position to a position effective to displace said coupling upon movement of said carriage into the position corresponding to the depressed key and an operating member for moving said shift control train to operate position, with a normally ineffectively positioned latch adjustable upon movement of said operating member to restrain said spring retractable member in effective position upon displacement of said coupling and contact member for adjusting said latch to ineffective position upon movement of said carriage into said end position.

HAROLD W. PINCKNEY.

REFERENCES CITED

The following references are of record in the file of this patent:

UNITED STATES PATENTS

| Number | Name | Date |
|---|---|---|
| 2,403,273 | Friden | July 2, 1946 |
| 2,428,206 | Dustin | Sept. 30, 1947 |
| 2,502,321 | Harrison | Mar. 28, 1950 |
| 2,531,204 | Gang | Nov. 21, 1950 |